(12) United States Patent
Beaucoup

(10) Patent No.: US 7,970,123 B2
(45) Date of Patent: Jun. 28, 2011

(54) ADAPTIVE COUPLING EQUALIZATION IN BEAMFORMING-BASED COMMUNICATION SYSTEMS

(75) Inventor: Franck Beaucoup, Dunrobin (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 1647 days.

(21) Appl. No.: 11/253,634

(22) Filed: Oct. 20, 2005

(65) Prior Publication Data

US 2007/0093714 A1   Apr. 26, 2007

(51) Int. Cl.
    *H04M 9/08*   (2006.01)
(52) U.S. Cl. .................................... 379/406.02
(58) Field of Classification Search .............. 379/406.02
    See application file for complete search history.

(56) References Cited

U.S. PATENT DOCUMENTS

| | | | | |
|---|---|---|---|---|
| 5,353,376 | A * | 10/1994 | Oh et al. | 704/233 |
| 7,035,415 | B2 * | 4/2006 | Belt et al. | 381/92 |
| 7,515,721 | B2 * | 4/2009 | Tashev et al. | 381/92 |
| 7,630,503 | B2 * | 12/2009 | Schulz et al. | 381/92 |
| 2002/0015500 | A1 | 2/2002 | Belt et al. | |
| 2002/0138254 | A1 * | 9/2002 | Isaka et al. | 704/208 |
| 2003/0118200 | A1 | 6/2003 | Beaucoup et al. | |
| 2004/0125942 | A1 | 7/2004 | Beaucoup | |
| 2005/0094795 | A1 | 5/2005 | Rambo | |

FOREIGN PATENT DOCUMENTS

| | | |
|---|---|---|
| EP | 0854625 A | 7/1998 |
| EP | 1538867 A | 6/2005 |
| EP | 06/120704 | 2/2009 |
| WO | WO 00/18099 A | 3/2000 |

OTHER PUBLICATIONS

Kellermann, W.L. "Acoustic Echo Cancellation for Beamforming Microphone Arrays" Microphone Arrays—Brandstein, Ward (ed) May 2001, pp. 281-306, Springer, Berlin.
Herbordt, W. et al; "Joint Optimization of LCMV Beamforming and Acoustic Echo Cancellation for Automatic Speech Recognitition" IEEE ICASSP Mar. 2005.
Kammeyer, K-D. et al. "New Aspects of Combining Echo Cancellers with Beamformers" IEEE ICASSP Mar. 2005.
Beaucoup, F. "Parallel Beamformer Design Under Response Equalization Constraints" IEEE ICASSP May 2004, Montreal Canada.

* cited by examiner

*Primary Examiner* — Alexander Jamal

(57) ABSTRACT

A method and system for rapid adaptive coupling equalization in beamforming-based communication systems, particularly sector-based beamforming systems, provides smooth transitions for AEC when the look direction of the communication system changes and when the acoustic environment varies with time. The coefficients of inactive beamformers are modified in real-time, using adaptive beamforming techniques based on the real-time loudspeaker-coupling signal, in order to force the outputs of inactive beamformers to have the same response to the loudspeaker coupling signal as the active beamformer does.

19 Claims, 2 Drawing Sheets

ADAPTIVE COUPLING EQUALIZATION IN BEAMFORMING-BASED COMMUNICATION SYSTEMS

FIELD OF THE INVENTION

The present invention relates generally to audio systems. More particularly, the present invention relates to adaptive coupling equalization in beamforming-based communication systems, such as conference telephony systems.

BACKGROUND OF THE INVENTION

Beamforming is a technique for providing spatial directivity in communication systems, such as audio conferencing systems. Beamforming can be implemented with directional microphones, or combinations of omni-directional microphones forming a microphone array. Beamforming can be used to discriminate a source position in a noisy environment by adding a weighted combination of the signals from each microphone. This creates a desired "look" direction aimed at the source, or talker, position. Beamformers are logical elements that correspond to the combination of one or more microphone inputs. Multiple beamformers are typically provided to give a number of look directions or sectors. The beamformers can be fixed, or they can provide adaptive beamforming to minimize undesired near-end noise or interference signals in real time. In adaptive beamforming, the impulse responses or gains of the microphones are dynamically adjusted to optimize source location, signal-to-noise ratio, or other desired audio characteristics in changing acoustic environments. Adaptive beamforming systems are complex, computationally intensive and suffer from general robustness issues, such as desired signal cancellation. It is often simpler to provide sector-based beamforming in consumer and enterprise devices, such as conference telephones. Such units are designed to provide a sufficient number of static beams (e.g. twelve equally spaced beams) to accommodate a number of call participants arrayed around the base unit. The conference unit can switch between static beamformers using a state machine, typically based on talker localization.

In full-duplex audio communication systems, acoustic echo cancellation (AEC) is typically applied to prevent reverberation, howling and other undesirable effects. For example, in speaker phones, a portion of the audio signal output by the loudspeaker and reflected in the reverberant environment is received by the microphones. Unless it is compensated for, this phenomenon is distracting to participants in telephone calls and is considered a nuisance. Adaptive AEC techniques are well known in the art.

The efficient integration of beamforming and AEC continues to be a challenge. One approach has been to perform AEC first on all the input microphone signals, in parallel, prior to beamforming. This approach has a prohibitive computational cost, because it requires as many acoustic echo cancellers, running in parallel, as there are sensors in the device.

In another common approach, the beamforming is performed first, and a single acoustic echo canceller is placed at the output of the beamformer. Due to differing physical characteristics, such as furniture placement, room design, and location of participants, each beamformer will have different echo characteristics. When the look direction or beamforming coefficients change, the AEC algorithm must adapt to the new echo characteristics. This approach presents a challenge to the AEC operation, because the directional signal has characteristics that vary according to the spatial area to which the system is looking. For example, the acoustic echo path and room characteristics (background noise, etc) may change suddenly as the system changes its look direction to accommodate a new talker. Without special care, the AEC algorithm must converge to very different cancellation coefficients each time the system changes its look direction. This can result in poor echo cancellation until the AEC algorithm converges, and, accordingly, poor transitions between beamformers, particularly if the AEC does not quickly converge to the required cancellation coefficients.

For the general case of time-varying, or adaptive, beamforming, several structures have been recently proposed to combine the optimization processes of beamforming and echo cancellation into a single optimization process. The proposed structures include those of: W. Kellermann, "Acoustic Echo Cancellation for Beamforming Microphone Arrays," in Microphone Arrays. M. Brandstein, D. Ward (ed.), Springer, Berlin, May, 2001, pp. 281-306; W. Herbordt, S. Nakamura, W. Kellermann, "Joint Optimization of LCMV Beamforming and Acoustic Echo Cancellation for Automatic Speech Recognition," Proc. of IEEE Intl. Conf. on Acoustics, Speech and Signal Processing (ICASSP) 2005, March 2005; K.-D. Kammeyer, M. Kallinger, A. Mertins, "New Aspects of Combining Echo Cancellers with Beamformers," Proc. of IEEE Intl. Conf. on Acoustics, Speech and Signal Processing (ICASSP) 2005, March 2005; and US Patent Publication No. 2002/0015500, entitled Method And Device For Acoustic Echo Cancellation Combined With Adaptive Beamforming, to Belt et al. These methods tend to be complex and are not optimal for sector-based beamformers, where a known number of fixed beamformers are used to cover a desired spatial area in concert with an apparatus used to switch from one beamformer to another. The described methods are also designed for slowly varying beamformers, such as adaptive noise or interference cancellation beamformers, and do not efficiently handle sudden and possibly drastic changes that occur in a switched-beamforming structure.

To take advantage of the somewhat simpler framework of sector-based, switched beamforming, US Patent Publication No. 2004/0125942, entitled Method Of Acoustic Echo Cancellation In Full-Duplex Hands-Free Audio Conferencing Systems With Spatial Directivity, to Beaucoup et al., the contents of which are incorporated herein by reference, proposes storing the information pertaining to echo cancellation for each "sector", in memory. According to this structure, the information pertaining to echo cancellation for each fixed beamformer is stored in memory as a workspace, and retrieved from memory the next time the talker localization algorithm re-selects the sector. This structure works well and provides smooth transitions from beamformer to beamformer in stationary, or essentially time invariant, acoustic environments. It does suffer from problems, however, in non-stationary (time-varying) acoustic environments. To be precise, if the acoustic environment, or echo path for a particular beamformer, changes significantly between two utterances of a beamformer being chosen by the localization algorithm, then the information stored in the workspace for the particular beamformer no longer provides good echo cancellation and the performance of the system will degrade. Another drawback of this approach is that, in order to be entirely trained in terms of echo cancellation, the device needs to operate in all possible beamformer positions and perform AEC in each position.

In order to minimize the amount of information that has to be stored in the workspaces, a method was proposed in F. Beaucoup, "Parallel Beamformer Design Under Response Equalization Constraints" Proc. of IEEE Intl. Conf. on Acoustics, Speech and Signal Processing (ICASSP) 2004, Montreal, Canada, May 2004, to optimally design the fixed beamformers to ensure that they all have the same response to a certain equalization signal. For example, the equalization signal can be chosen to be as close as possible to the loudspeaker-coupling signal. This coupling equalization approach, however, can only provide limited improvement in practice, because the loudspeaker-coupling signal can only be known a priori with a limited accuracy. One reason for this is that it is only possible to determine the direct-path coupling signal, i.e. the coupling signal resulting from the direct feedback between the loudspeaker and the microphones, at the design stage. The indirect-path coupling signal, resulting from reflections from various objects in the acoustic environment, depends on the acoustic environment in which the device is operated and cannot be known in advance. Even if only the direct-path signal is targeted, which is reasonable since it accounts for most of the energy of the echo, other factors come into play that limit the accuracy of a priori knowledge. These factors include loudspeaker-induced structural vibrations, acoustic leakage, and component and manufacturing variability. Therefore, in practice, this design method can only be used to minimize the amount of information that needs to be stored in each workspace, and does not solve the problem of optimizing the integration of beamforming and AEC.

Therefore, it is desirable to provide a communication system and method that can provide rapid adaptive coupling equalization in beamforming-based communication systems, particularly sector-based beamforming systems, in order to provide smooth transitions for acoustic echo cancellation when the look direction of the communication system changes and when the acoustic environment varies with time.

SUMMARY OF THE INVENTION

It is an object of the present invention to obviate or mitigate at least one disadvantage of previous beamforming-based communication systems, particularly sector-based beamforming systems.

In a first aspect, the present invention provides a method for adaptive coupling equalization in beamforming-based communication systems. The method comprises combining coupling signals from an active beamformer and an inactive beamformer; and substantially equalizing the coupling response of the inactive beamformer to the coupling response of the active beamformer using adaptive beamforming techniques in response to the combined signal. The combining step includes generating an error signal representing the difference between the active beamformer coupling signal and the inactive beamformer coupling signal. In a presently preferred embodiment, the adaptive beamforming is applied during periods of far-end speech and is frozen during periods of double talk. Each inactive beamformer in the beamformer array is equalized in this manner, and when the system switches to a new active beamformer, the equalization method is repeated.

In a further aspect, there is provided a system for adaptive coupling equalization in a beamforming-based communication system having one beamformer in a beamformer array designated as an active beamformer. The system comprises means for generating an error signal and an adaptive equalization engine for each for each inactive beamformer in the array. The generated error signals are substantially equal to the difference between a response of the active beamformer to a loudspeaker-coupling signal and the responses of each inactive beamformer to that same signal. The adaptive equalization engines generate adaptation coefficients for each inactive beamformer in response to its respective error signal. The beamformer array can be a sector-based array with beamformers that are optimized to have an equalized response to a direct coupling signal. In another embodiment, the system includes means for designating a new active beamformer in response to a change in input signals to the array and an acoustic echo canceller to apply acoustic echo cancellation to the output of the active beamformer.

In a further aspect there is provided an audio beamforming-based communication system. The system includes an input array, a beamformer array, switching means, a state machine, and an acoustic echo canceller. Each inactive beamformer in the array includes means for generating error signals, and an adaptive equalization engine. The input array is for detecting near-end activity. The beamformer array is for receiving near-end signals from the input array. The state machine designates an active beamformer in response to the near-end signals. The switching means switches to the active beamformer in the array. The acoustic echo canceller applies acoustic echo cancellation to an output of the active beamformer. The error signal generated is substantially equal to the difference between the response of the active beamformer to a loudspeaker-coupling signal and the response of the inactive beamformer to the same signal. The adaptive equalization engine applies an adaptive beamforming algorithm, in response to the error signal, to adaptively equalize the responses of the inactive beamformer and the active beamformer. In various embodiments, the input array is an omni-directional microphone array, the beamformer array is a sector-based switched beamformer array and the adaptive beamforming algorithm is selected from block-based, sample-based, time-domain, sub-band and frequency domain adaptive filtering algorithms.

In a further aspect there is provided a method for achieving rapid convergence of an acoustic echo canceller in a switched beamforming-based communication system. The method includes the steps of adaptively equalizing coupling responses of inactive beamformers in a beamformer array to a coupling response of a currently active beamformer in the array; applying acoustic echo cancellation to an output of the currently active beamformer; switching one of the inactive beamformers to be the currently active beamformer in response to a change in input characteristics; and repeating the above steps. In embodiments of this aspect of the present invention, the steps of adaptively equalizing and applying echo cancellation are performed concurrently. Typically, the adaptive equalization is performed during periods of far-end speech. For each inactive beamformer, adaptively equalizing the coupling responses may include generating an error signal representing the difference between coupling signals from the currently active beamformer and from the inactive beamformer; and applying adaptive beamforming, in response to the error signal, to substantially equalize the response of the inactive beamformer to the response of the active beamformer.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
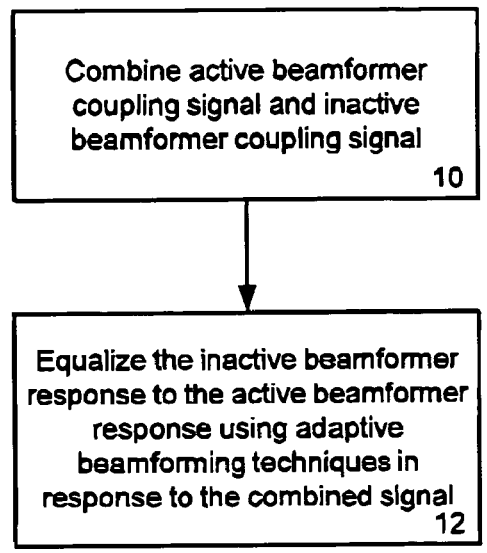
FIG. 1 is a flowchart illustrating a method of beamformer equalization according to an embodiment of the present invention.

Generally, the present invention provides a method and system for rapid adaptive coupling equalization in beamforming-based communication systems, particularly sector-based beamforming systems, to provide smooth transitions for AEC when the look direction of the communication system changes and when the acoustic environment varies with time. The output of beamformers is modified in real-time, based on the real-time loudspeaker-coupling signal, in order to force the outputs to have the same response to the loudspeaker coupling signal. In other words, the beamformer outputs are equalized with respect to the loudspeaker coupling signal. This can be done with conventional adaptive beamforming techniques, including block-based, sample-based, time-domain, sub-band and frequency-domain adaptive filtering algorithms. These techniques are well known in the art of adaptive array processing, and are described in detail in e.g. D. G. Manolakis, V. K. Ingle, S. M. Kogon, *Statistical And Adaptive Signal Processing*, McGraw-Hill, 2000 and H. L. Van Trees, *Optimum Array Processing*, John Wiley and Sons, 2002. A presently preferred implementation uses a sample-by-sample approach, such as the Generalized Side-lobe Canceller (GSC) technique, to average out the computational complexity of the adaptation process, but other implementations of the adaptive process also fall within the scope of this invention.

The adaptive equalization process of the present invention is aimed at response equalization between each of the non-active beamformers and the "look direction", or active, beamformer, not at noise or interference reduction as in conventional applications. To achieve this, the beamformer adaptation attempts to minimize the statistical expectation of the difference between the output of each beamformer and the output of the look direction beamformer to the loudspeaker-coupling signal. Therefore, the number of adaptive beamforming processes is N−1, where N is the total number of beamformers N. The error signal used to drive the adaptive equalization process in each beamformer is the difference between that beamformer's output and the look direction beamformer output. Preferably, the adaptive equalization process is carried out only during periods of far-end speech activity, and is frozen if near-end and far-end speech are present, as is commonly provided by a double-talk detector embedded in an AEC algorithm.

The present invention is intended for any audio device comprising or dealing with a loudspeaker and an array of microphones, where the response of multiple beamformers to the loudspeaker-coupling signal could be equalized among the beamformers. The present invention is particularly suited to devices having a number of beamformers covering a number of look directions, such as described in M. Tetelbaum, F. Beaucoup. "Design And Implementation Of A Conference Phone Based On Microphone0 Array Technology" Proc. of Global Signal Processing Conference and Expo (GSPx) 2004, San Jose, Calif., September 2004. In the embodiment below, the beamformers are assumed fixed with respect to near-end speech or near-end noise, as opposed to the conventional adaptive beamforming scenario, where a beamformer is changed adaptively so as to cancel undesired near-end noise or interference signals.

FIG. 1 is a flowchart of the general method of beamformer equalization according to the present invention. The coupling signal of the active beamformer is combined with the coupling signal of each of the inactive beamformers, as illustrated in step 10. The response of the inactive beamformer is then substantially equalized to the response to the active beamformer using an adaptive beamforming technique in response to the combined signal, as shown in step 12.

Figure 2:
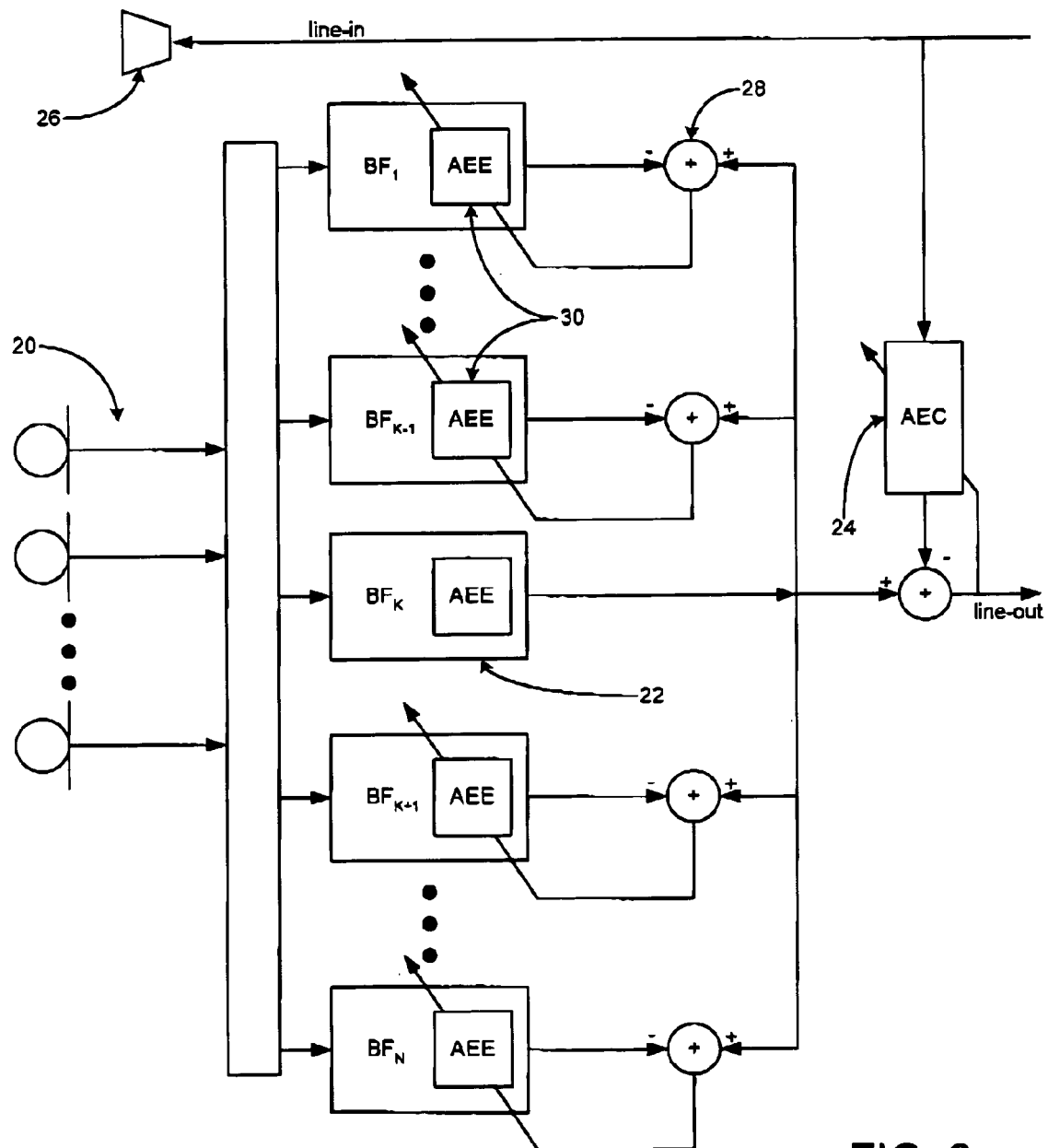
FIG. 2 is a block diagram of an embodiment of the adaptive coupling equalization system of the present invention.

A block diagram illustrating an embodiment of a system according to the present invention is shown in FIG. 2. A microphone array 20 receives audio input from a near end party, which is passed to an array of beamformers, $BF_1$ to $BF_N$. A first beamformer 22, $BF_K$, has been chosen as the active, or look direction, beamformer. The output of the active beamformer is passed through the acoustic echo canceller 24 and transmitted to the far-end party as indicated by the line-out signal. The particular implementation of the acoustic echo canceller is not critical to the present invention. The line-in signal received from the far end party is typically emitted by a loudspeaker 26.

The active beamformer is selected by an appropriate state machine (not illustrated), typically based on talker localization, and switching means are provided to switch from the current active beamformer to a new active beamformer based on detected changes in the audio input signal characteristics. The beamformers $BF_1$ to $BF_N$ and acoustic echo canceller 24 can be implemented in a digital signal processor (DSP) as known in the art. One such implementation is disclosed in U.S. Patent Publication 2003/0118200, incorporated herein by reference.

Once beamformer $BF_K$ has been chosen as the active beamformer, the inactive beamformers, $BF_1$ to $BF_{K-1}$ and $BF_{K+1}$ to $BF_N$, are subjected to an adaptive coupling equalization process. Using beamformer $BF_1$ as an example, a combiner 28 receives an output from inactive beamformer $BF_1$ and an output from active beamformer $BF_K$, and generates an error signal that, in this example, is the difference between the active beamformer output and the inactive beamformer output. This error signal is then fed to an adaptive equalization engine 30 in $BF_1$. The adaptive equalization engine 30 applies an adaptive beamforming algorithm, based on the error signal, to generate new beamformer coefficients to equalize the response of the inactive beamformer $BF_1$ to the response of the active beamformer $BF_K$. The response of each inactive beamformer is subjected to this process to equalize its response to that of the active beamformer $BF_K$.

Figure 3:
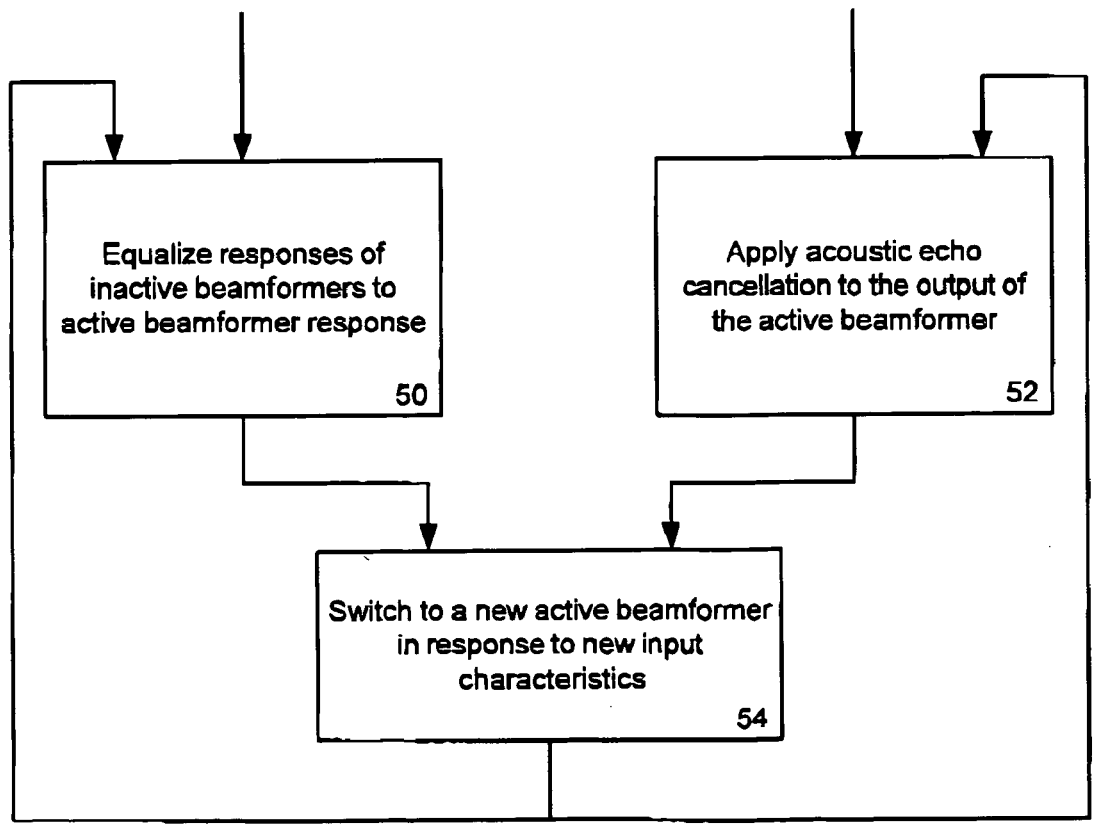
FIG. 3 is a flowchart illustrating a method of system equalization according to an embodiment of the present invention.

FIG. 3 generally illustrates the method of beamformer system equalization of the present invention. In step 50, the responses of the inactive beamformers are equalized to the response of the active beamformer. In step 52, acoustic echo cancellation is applied to the output of the active beamformer. These steps can be performed in series, or in parallel as illustrated. In step 54, an inactive beamformer is selected as the new active beamformer, and the system switches the active beamformer in response to a change in the input characteristics. Steps 50 and 52 are then repeated, and the process continues.

When the look direction of the system changes, typically in response to a new talker, a new beamformer is designated as the active beamformer, and the adaptive equalization structure of the present invention automatically switches to the new set of inactive beamformers. A new error signal, based on the newly active beamformer output, is now fed to each inactive beamformer, as described above.

The adaptation process preferably takes place at the same time as the AEC adaptation on the output of the active beamformer. Within a short period of time, the AEC converges to the echo path of the first active sector beamformer, $BF_K$, and the other beamformers have adaptively modified so that they present a coupling response essentially identical to that of $BF_K$, or at least its direct-path coupling response. Therefore, training is readily achieved on all sectors. As used herein, coupling response means the coupling response of a beamformer to the loudspeaker signal.

The adaptive coupling equalization is performed during far-end speech activity, concurrently with the acoustic echo canceller operating on the look direction beamformer. It is applied concurrently to all beamformers except the look direction beamformer. The adaptation process can be implemented with conventional adaptive beamforming techniques usually used for interference cancellation purposes. In a presently preferred embodiment, each adaptive equalization engine 30 uses a Generalized Side-lobe Canceller (GSC) structure with a blocking matrix and a sample-by-sample adaptive process running on its output.

When the look direction changes and a different beamformer is selected, its AEC response will already be close to ideal and the transition from one look direction to another will be smooth. As the response of the newly selected beamformer is already similar to the previously active beamformer output, acoustic echo canceller 24 rapidly converges to optimum performance. In addition to providing rapid convergence of acoustic echo canceller 24, the present invention allows the communication system to adapt itself to a time-varying acoustic environment.

To minimize the amount of adaptation necessary to achieve equalization, and thus its effects on the beamformers' directivity, it is preferable to begin with beamformers that are already substantially equalized to a real-time loudspeaker-coupling signal. The beamformer design method described in F. Beaucoup, "Parallel Beamformer Design Under Response Equalization Constraints" Proc. of IEEE Intl. Conf. on Acoustics, Speech and Signal Processing (ICASSP) 2004, Montreal, Canada, May 2004, the contents of which are incorporated herein by reference, where an a priori loudspeaker-coupling signal is either measured or simulated during the product design phase, is one method of providing such beamformers. The adaptive coupling equalization process of the present invention then only has to compensate for the non-predictable factors such as component variability, manufacturing variability, and specifics of the acoustic environment in which the device is operated. If the a priori signal is not too different from the real, observed signal, then the adaptive equalization process should need to perform only minor adjustments, while conserving the directivity characteristics of each beamformer.

In another embodiment, the equalization of signals is only performed on a subset of the inactive beamformers. Where there are sufficient statistical similarities between the coupling responses, the equalization process is avoided to reduce the computational complexity of the system.

The sequencing of the adaptive coupling equalization and the AEC is not critical to the present invention, These processes can be performed simultaneously or scheduled one after the other in order to reduce overall complexity. While it is currently believed that freezing the equalization process during periods of double-silence is preferable, it is fully contemplated by the inventor that equalization can occur during such periods. Similarly, any adaptation process where the adaptive coupling equalization takes place in the presence of far-end speech and/or in the absence of near-end speech falls within the scope of the present invention.

Depending on how volatile the acoustic environment is expected to be, the method of the present invention can be used only during the training stage of the device. The adaptive equalization process can then be frozen. The stored workspace approach described in US Patent Publication No. 2004/0125942 could then be used to alleviate the imperfections of the adaptive equalization process. All these variants, as well as others that will be obvious to someone skilled in the art of acoustic echo cancellation in the context of microphone array processing, fall within the scope of this invention.

Although it is an underlying assumption in the embodiments described above, the beamformers do not need to be fixed with respect to near-end noise or near-end speech. It fully within the contemplation of this invention, although not optimal in terms of the effect of beam switches on the echo canceller, to use noise or interference-cancelling adaptive beamformers in conjunction with the present invention. The two adaptation processes can take place at different times and can be scheduled in a number of ways with respect to each other, as will be apparent to those of skill in the art, provided that adaptive filtering techniques are used to equalize the response of a number of beamformers to a loudspeaker-coupling signal.

As will be apparent to those of skill in the art, the present invention permits all beamformers to adaptively equalize their response to the loudspeaker-coupling signal, thereby ensuring smooth transitions for the acoustic echo canceller when the beamforming device changes its look direction. The AEC training time is improved, since the adaptive equalization takes place at the same time as the AEC adaptation. Once the AEC is trained on the first beamformer, all beamformers are equalized and the device is substantially entirely trained. The tracking capability is expected to be as good as with single-microphone devices, since all beamformers are kept constantly equalized with respect to the loudspeaker-coupling equalization signal.

It will also be apparent that the system of the present invention is far less computationally complex than previously proposed structures where the AEC is performed first. Such prior art structures typically require one acoustic echo canceller per microphone. For example, a system having six microphones and twelve beamformers requires six acoustic echo cancellers, whereas, using the adaptive equalisation process of the present invention only requires the equivalent of two echo cancellers. The resultant savings in computational cost and complexity can, therefore, be significant.

It is also contemplated that the present technique of adaptive equalization can be implemented to adjust all sectors at other stages of the signal processing, if a major change in echo path occurs. This would improve the tracking ability of the engine, although the effect on the directivity of the beamformers might be adversely affected.

Although the present invention has been presented in terms of embodiments related to conference telephony, it is equally applicable any audio device comprising loudspeakers and an array of microphones, where the response of multiple beamformers to the loudspeaker coupling signals can be equalized amongst the beamformers.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method for adaptive coupling equalization in beamforming-based communication systems, comprising steps of:
combining coupling signals from an active beamformer and an inactive beamformer; and
substantially equalizing the coupling response of the inactive beamformer to the coupling response of the active beamformer using an adaptive beamforming technique in response to the combined signal,
wherein the adaptive beamforminq technique is frozen during periods of double talk.

2. The method of claim 1, wherein the step of combining includes generating an error signal representing the difference between the active beamformer coupling signal and the inactive beamformer coupling signal.

3. The method of claim 1, wherein the adaptive beamforming technique uses a generalized side-lobe canceller technique.

4. The method of claim 1, wherein the adaptive beamforming technique is applied during periods of far-end speech.

5. The method of claim 1, wherein the steps of combining and equalizing are repeated for each inactive beamformer in a beamformer array.

6. The method of claim 5, further including switching to a new active beamformer, and repeating the steps of combining and equalizing for each inactive beamformer in the array.

7. A system for adaptive coupling equalization in a beamforming-based communication system having one beamformer in a beamformer array designated as a active beamformer; and comprising, for each inactive beamformer in the array:
means for generating an error signal substantially equal to the difference between a response of the active beamformer to a loudspeaker-coupling signal and a response of the inactive beamformer to the loudspeaker-coupling signal; and
an adaptive equalization engine to generate adaptation coefficients for the inactive beamformer using an adaptive beamforming technique in response to the error signal, whereby the adaptive beamforming technique is frozen during periods of double talk.

8. The system of claim 7, wherein the beamformer array is a sector-based array.

9. The system of claim 7, wherein beamformers in the beamformer array are optimized to have an equalized response to a direct coupling signal.

10. The system of claim 7, further including means for designating a new active beamformer in response to a change in input signals to the array.

11. The system of claim 7, further including an acoustic echo canceller to apply acoustic echo cancellation to the output of the active beamformer.

12. An audio beamforming-based communication system, comprising:
an input array for detecting near-end activity;
a beamformer array for receiving near-end signals from the input array;
a state machine to designate an active beamformer in response to the near-end signals and switching means to switch to the active beamformer;
for each inactive beamformer in the array:
means for generating an error signal substantially equal to the difference between a response of the active beamformer to a loudspeaker-coupling signal and a response of the inactive beamformer to the loudspeaker-coupling signal; and
an adaptive equalization engine to apply an adaptive beamforming algorithm, in response to the error signal, to adaptively equalize the responses of the inactive beamformer and the active beamformer; and
an acoustic echo canceller to apply acoustic echo cancellation to an output of the active beamformer,
wherein the adaptive beamforming is frozen during periods of double talk.

13. The system of claim 12, wherein the input array is an omni-directional microphone array.

14. The system of claim 12, wherein the beamformer array is a sector-based switched beamformer array.

15. The system of claim 12, wherein the adaptive beamforming algorithm is selected from block-based, sample-based, time-domain, sub-band and frequency domain adaptive filtering algorithms.

16. The system of claim 7, further comprising:
an input array for detecting near-end activity, wherein the beamformer array receives near-end signals from the input array; and
a state machine to designate an active beamformer in response to the near-end signals and switching means to switch to the active beamformer.

17. The method of claim 1, wherein adaptive equalization is frozen during periods of double silence.

18. The method of claim 7, wherein adaptive equalization is frozen during periods of double silence.

19. The method of claim 12, wherein adaptive equalization is frozen during periods of double silence.

* * * * *